Oct. 15, 1929.  L. R. HARTLEY  1,731,744
QUANTITY RECORDING MECHANISM FOR FLUID DISPENSING APPARATUS
Filed Jan. 22, 1926  4 Sheets-Sheet 2
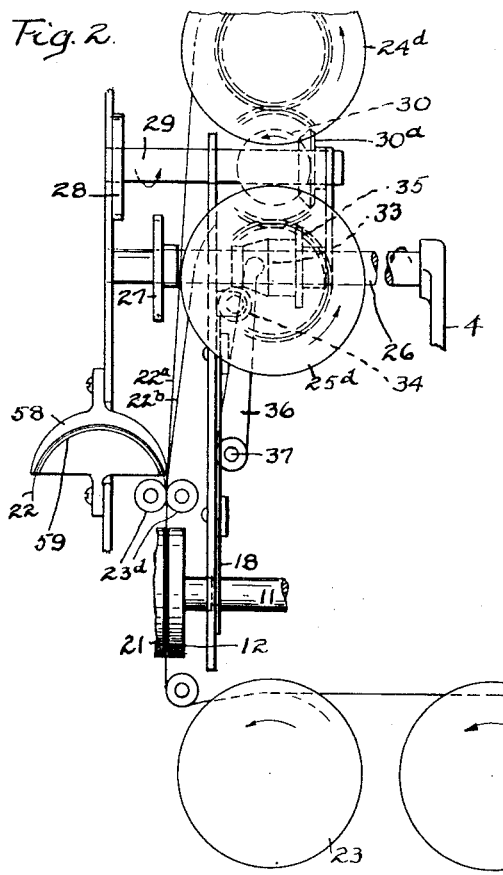
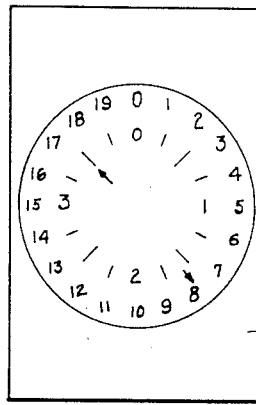
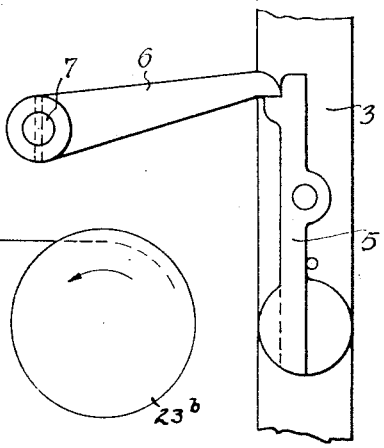
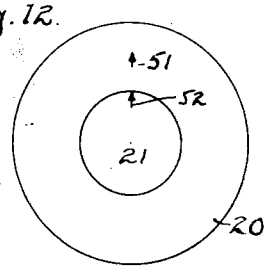
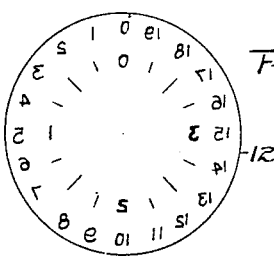
INVENTOR.
L. R. Hartley
BY
ATTORNEY.

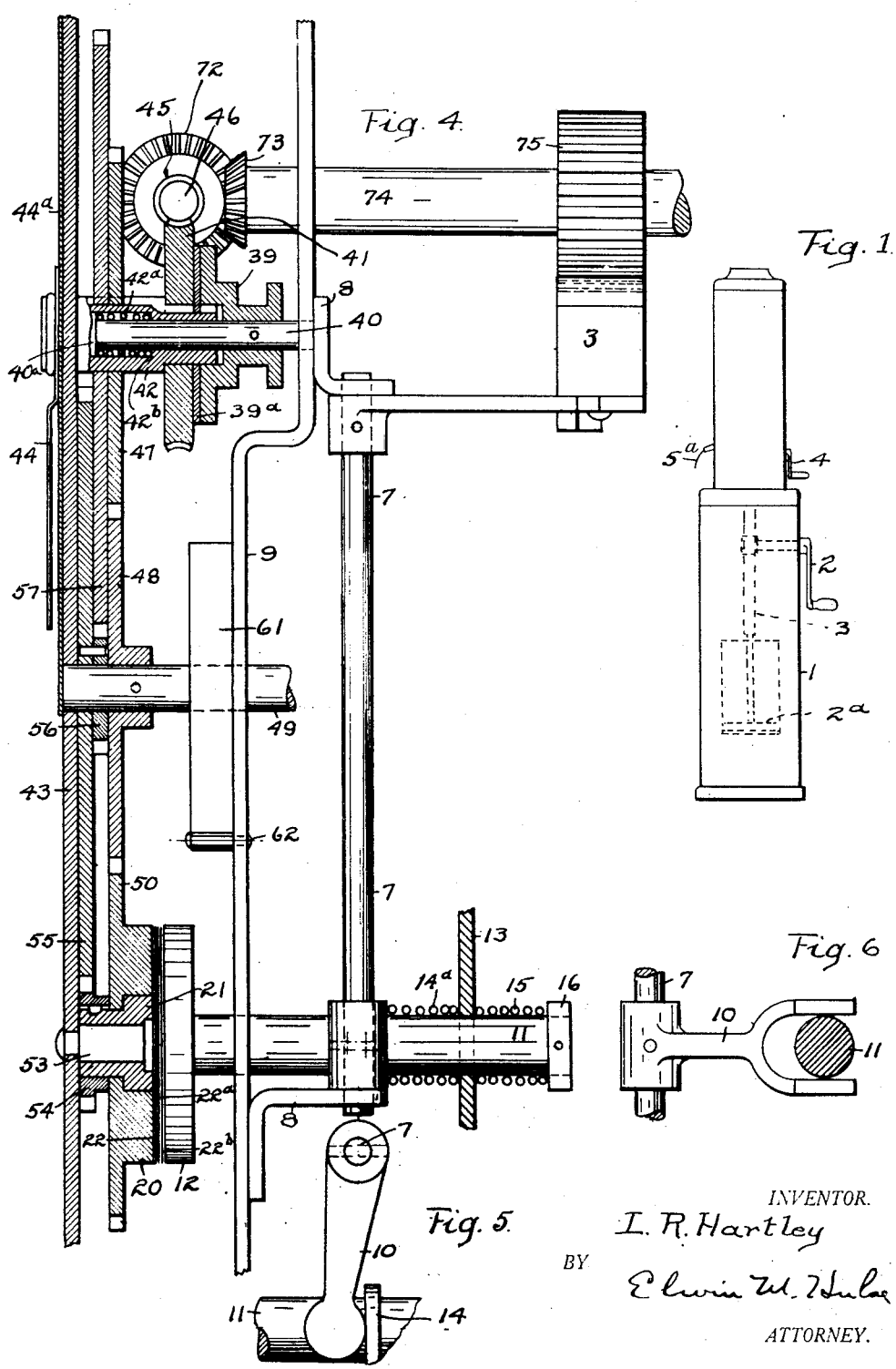

Oct. 15, 1929.  L. R. HARTLEY  1,731,744
QUANTITY RECORDING MECHANISM FOR FLUID DISPENSING APPARATUS
Filed Jan. 22, 1926  4 Sheets-Sheet 3
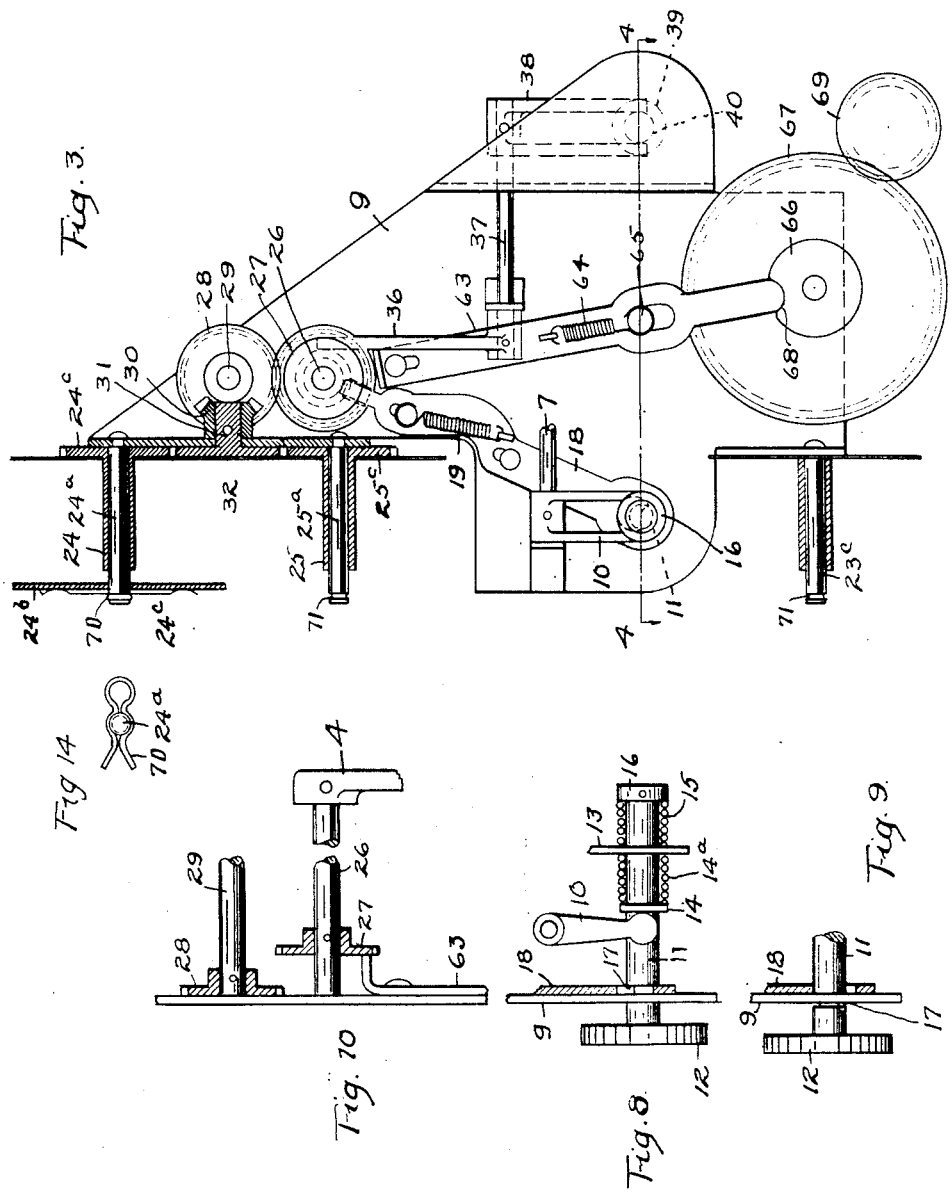
INVENTOR.
L. R. Hartley
BY
ATTORNEY

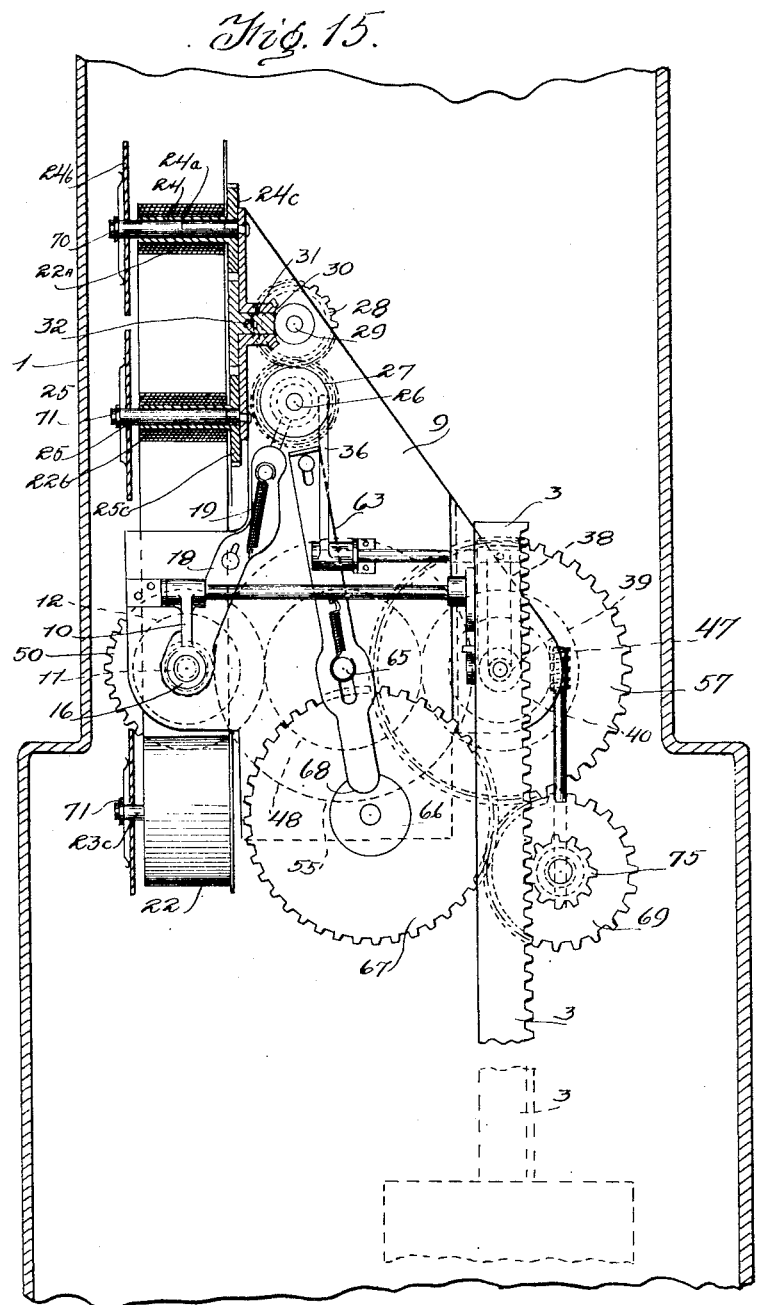

Patented Oct. 15, 1929

1,731,744

UNITED STATES PATENT OFFICE

LEE R. HARTLEY, OF FORT WAYNE, INDIANA, ASSIGNOR TO S. F. BOWSER & COMPANY, OF FORT WAYNE, INDIANA, A CORPORATION

QUANTITY-RECORDING MECHANISM FOR FLUID-DISPENSING APPARATUS

Application filed January 22, 1926. Serial No. 83,020.

The invention relates to registering mechanisms for fluid dispensing apparatus.

Mechanisms for dispensing pumps for registering and issuing records have been devised but in all such the complete or whole quantity of liquid dispensed is shown but the intermediate amounts or fractions of liquid are not shown.

The object of the invention is to provide a novel mechanism for fluid dispensing apparatus by which to issue a record in duplicate of the exact amount of fluid dispensed at each operation, the summation of which records will equal the reading of the meter or device recording total delivery covering the same period.

Another object is to provide a mechanism by which a ticket may be issued to a customer upon which will be indicated to the customer the exact amount of liquid dispensed to him.

Another object is to provide a mechanism for liquid dispensing pumps for issuing a ticket to a customer indicating the exact amount of liquid dispensed to him in which mechanism means are provided by which a ticket cannot be issued until the stroke for the unit measure has been completed.

An embodiment of the invention is illustrated in the accompanying drawings in which, Figure 1 is an elevational view of a dispensing pump having the invention applied thereto; Fig. 2 a side elevational view of the registering mechanism; Fig. 3 a fractional front elevational view of the same; Fig. 4 a cross-sectional view in enlarged scale on line 4—4 of Fig. 3; Fig. 5 a side elevational view of the die-retracting lever; Fig. 6 a plan view of the same; Fig. 7 an elevational view of the dog and lever for actuating the die-retracting lever; Fig. 8 a plan view of the reciprocable die in retracted condition; Fig. 9 a similar view of the reciprocable die in operated position; Fig. 10 an elevational view of the crank and gear mechanism and lock; Fig. 11 an elevational view of the reciprocable die; Fig. 12 an elevational view of the revoluble indicating dies; Fig. 13 a plan view of one of the records issued by the mechanism; and Fig. 14 an end view of the reel support and lock. Figure 15 is a view from the right side of Figure 1 showing a portion of that figure to an enlarged sealer, a portion of the casing being broken away to show the working parts.

Referring to the illustrative embodiment of the invention, 1 represents the casing of a dispensing pump of the reciprocating plunger type and 2 is the crank for operating the plunger to which plunger the plunger rod or rack 3 (Figs. 4 and 7) is connected, 4 is the crank by which the registering mechanism is operated and 5ª represents a customer's ticket that has been issued by the mechanism but not removed therefrom.

A dog 5 is pivoted on the rack 3 and is adapted to engage a lever 6 secured to a horizontally disposed shaft 7 revolubly mounted in the brackets 8 fixed to the frame or casing 9. A bifurcated lever 10 is also secured to the shaft 7, its bifurcated end being loosely engaged on a stem 11 secured to a die 12 upon the outer face of which are formed two concentric series of numerals, the outer series of numerals, the outer series of which represent gallons and the inner series quarts and fractions thereof, or any other indicia may be formed on the die.

The stem 11 is longitudinally slidable in the frame members 9 and 13, and the lever 10 is adapted to abut a collar 14 formed on or secured to the stem and to reciprocate the stem and die rearwardly. This movement of the stem is opposed by the spring 14ª that encircles the stem and abuts the frame member 13. The spring 15 on the stem abuts the member 13 and the collar 16 secured to the stem, and it retracts the die and stem slightly after the completion of its outward movement under the influence of the spring 14. A notch 17 is formed in the stem 11 into which a latch bar 18 under the influence of a spring 19 is adapted to engage. When the rack 3 is elevated upon operating the pump mechanism the dog 5 lifts the lever 6, the movement of which is transmitted through the shaft 7 and the lever 10 to the stem 11, thereby retracting the die or moving it rearwardly. Just before the dog 5 disengages from the lever 6 the notch 17 has been moved into register with the latch bar 18 and the spring 19 then draws the latch bar upwardly into the notch. The stem is now locked in its rearward position where the die is ready to deliver a hammer blow on the revoluble dies 20, 21 or the tapes 22, $22^a$, $22^b$, in front of the dies 20, 21. The normal spacing of the die 12 from the dies 20, 21 is sufficient to permit the tapes to pass. Three tapes 22, $22^a$, $22^b$ are shown in Figs. 2 and 4. They are wound on spools carried by the reels 23, $23^a$, $23^b$ respectively, each reel being mounted upon a spindle $23^c$. The tapes are led upwardly between the dies and between the rollers $23^d$ the tapes $22^a$, $22^b$ being continued to spools mounted on the sleeves 24, 25 that are revolubly mounted on the spindles $24^a$, $25^a$, respectively. The plate $24^b$ is loose on the spindles $24^a$, and a spring $24^c$ that abuts the head of the spindle holds the plate in tension against the spool and the tape that winds upon the spool. A similar plate is similarly mounted on the spindle $25^a$ and upon each spindle $23^c$. Each said plate is held from outward movement on the spindle by a spring clip 70 (Fig. 14) that is sprung into a groove 71 formed in the spindle.

The crank 4 is secured to the shaft 26 that is revolubly mounted and is also longitudinally movable. A gear 27 is secured to this shaft and is adapted to mesh with a gear 28 secured to a revoluble shaft 29. A bevel gear 30 is secured to the spindle 31 of a gear 32 which meshes with the gears $24^c$, $25^c$ that are formed on the sleeves 24, 25 respectively. The two receiving reels are, therefore, driven by the crank shaft 26, the gear $30^a$ on the shaft 29 being in mesh with the gear 30.

A cam 33 is secured to the crank shaft 26 that engages a roller 34 mounted on the latch bar 18 so that as the shaft 26 is moved inwardly the cam causes the latch bar to disengage from the slot 17 in the stem 11 of the die 12. The further inward movement of the shaft 26 causes the flange 35 thereon to abut and rock a lever 36 that is secured to a shaft 37, to which shaft a bifurcated lever 38 is secured that loosely engage a clutch 39 pinned to the shaft 40. A friction disk $39^a$ is keyed to the sleeve 42 in the keyway $42^c$ formed in the sleeve and lies between the clutch 39 and a worm wheel 41 that is loose on the sleeve 42 mounted on the shaft 40. The clutch normally engages the disk $39^a$ on the worm wheel 41 so that the wheel 41 will drive the sleeve. The sleeve projects through the casing or frame member 43 and carries a pointer 44 at its outer end that cooperates with selected numerals representing quantities which are formed on the dial plate $44^a$ by which cooperation the quantity of liquid dispensed is indicated to the operator and customer. A spring $42^a$, within a cavity formed in the sleeve, encircles the shaft 40 and lies between the shoulder $42^b$ formed in the sleeve and the head $40^a$ of the shaft 40, its function being to place tension on the shaft 40.

The worm wheel 41 meshes with a worm 45 that is mounted on a shaft 46. A bevel gear 72 is secured to the lower end of the shaft 46 and meshes with a bevel gear 73 that is secured to a shaft 74, to which shaft a pinion 75 is secured which meshes with the rack 3. When the pump mechanism is operated to discharge fluid the worm wheel 41 is driven and said wheel drives the sleeves 42 since the clutch 39 normally connects the worm wheel to the sleeve.

A gear 47 is keyed or otherwise secured to the sleeve 42 and meshes with a gear 48 secured to a shaft 49 revolubly mounted in frame members 9 and 43. The gear 48 meshes with a gear 50 formed on or secured to the annular die 20 that is revolubly mounted upon the second die 21 that is revolubly mounted upon a spindle 53 secured to the casing member 43. The gears 47, 48 and 50 are equal in ratio so that the die 20 is driven at the same speed as the sleeve 42. A pointer or arrow 51 (Fig. 12) is formed on the face of the die 20 and a similar pointer or arrow 52 is formed on the die 21.

A pinion 54 is secured to the die 21 and meshes with a gear 55 that is loosely mounted on the shaft 49 and is pinned to a pinion 56 also loosely mounted on the shaft 49. The pinion 56 meshes with a gear 57 keyed or otherwise secured to the sleeve 42. The gears 55 and 57 are similar and the pinions 54 and 56 are similar. The ratio of the gears 55, 57 to the pinions 54, 56 is 20 to one so that as the shaft 40 and the sleeve 42 are rotated, the said gearing will drive the die 21 twenty times as rapidly as the die 20. These dies are concentric with the reciprocable die 12 and when the die 12 is released from is retracted position, it strikes a blow on the tapes forcing them against the dies 20 and 21 and causes impressions of the arrows or pointers on the latter dies to be made on the tapes. The face of the tape $22^b$ that is opposed to the tape $22^a$ is coated with carbon material and the face of the tape $22^a$ that opposes the tape 22 is also coated with carbon material so that when the die 12 strikes a blow on the tapes a carbon impression of the numerals on that die will be formed on each tape $22^a$ and 22 and the arrows on the dies 20 and 21 will also be impressed on the tapes, the arrows pointing toward the correct impressed numerals on the tapes in accordance with the degree of rotation of the dies 20 and 21. The numerals on the die 12 and the arrows on the dies 20 and 21 project from the faces of those dies respectively so that the impressions of the numerals and arrows on the tapes 22 and 22ª are distinct.

After the operation of the pump has ceased and the reciprocating die 12 has made its printing stroke and has been retracted by the spring 15, the further inward longitudinal movement of the shaft 26 causes the flange 35 to abut the lever 36 and rock the same to release the clutch 39, thereby disconnecting the worm wheel from the sleeve 42 whereupon a spring 61 that is coiled about and attached to the shaft 49 and to a pin 62 projecting from the frame member 9 and which winds up when the pump mechanism is operated, expands and restores the trains of gears, the dies 20 and 21 and the pointer to normal zero position. The operation of the crank 2 then operates the upper reels and winds the tapes 22ª and 22ᵇ thereon respectively. These tapes carry the tape 22 with them, the upper end of the latter initially being engaged by a relatively sharp edge formed upon the guide 58 having a slot 59 therein through which the tape 22 is projected, a sufficient portion of the tape being exposed to include record made upon it by the dies. This portion is then torn or cut off to form a ticket 60 that the operator delivers to the customer. This ticket will disclose the exact amount of liquid dispensed in gallons, quarts or fractions of quarts, the arrows indicating the same.

In order that the ticket issuing mechanism cannot be operated until the stroke of the pump mechanism has been completed, I slidably mount a bar 63 upon the frame, the upper end of which is adapted to pass behind the gear 27 so that the crank shaft 26 cannot be shifted to engage the gear 27 in the gear 28. A spring 64 attached to the bar 63 and to the frame or a fixed stud 65 thereon tends to withdraw the said bar from behind the gear 27. The lower end of the bar rides on the periphery of the hub 66 of a gear 67, the hub having a depression or notch 68 therein adapted to receive the end of the bar 63. A gear 69 secured to the pinion shaft 74 meshes with the gear 67, so that the gear 67 is rotated whenever the pump mechanism is operated. The ratio of the gears 67 and 69 is such that the hub 66 will cause the bar to move out of the depression 68 and ride and remain on the periphery of the hub until the rack has been returned to the bottom of its stroke. The bar 63, therefore, is moved behind the gear 27 and remains there until the rack has reached the end of its downward stroke at which time the depression in the hub moves under the bar and the spring 64 draws it into the depression to release the ticket issuing mechanism.

The operation of the mechanism has been substantially described above, but to reiterate briefly, the operation of the same is as follows:

The operator sets the usual mechanism on the pump in accordance with the order of the customer and operates the pump mechanism. The rising rack 3 causes the dog 5 to rock the lever 6, the movement of which lever is transmitted to the lever 10 to retract the reciprocable die 12, whereupon the locking bar 18 locks the die in its retracted position. Since the worm gear 41 has a continuous driven connection through the pinion shaft 74 to the rack and the clutch 39 normally connects the gear to the sleeve 42, the said sleeve is rotated as the rack rises to rotate the pointer 44 to cause the trains of gears to rotate the dies 20 and 21 at the selected speeds and the spring 61 is wound up. The rotation of the pinion shaft 74 also causes the hub 66 of the gear 67 to maintain the locking bar 63 behind the gear 27 so that the crank shaft 26 of the ticket issuing mechanism cannot be operated until the rack has been returned to the bottom of its stroke. Upon the return stroke of the rack 3 the shaft 46, having a ratchet (not shown) connected to it so that it will rotate in one direction only, and the gear trains and dies 20, 21 remain at rest. The notch in the hub 66 permits the locking bar 63 to disengage from the gear 27 and the operator then moves the crank shaft 26 inwardly. The cam 33 on the shaft 26 depresses the locking bar 18 and the die 12 is thereby released to strike a blow upon the tapes. The further movement of the crank shaft rocks the lever 36 to release the clutch 39 whereupon the spring 61 reverses the motion of the gear trains to cause the dies 20 and 21 and the pointer 44 to return to zero. The further longitudinal movement of the crank shaft causes the gear 27 to engage the gear 28 whereupon the operator rotates the said shaft to issue a ticket. He continues the rotation of the crank shaft until a sufficient portion of the tape 22 clears the guide 58 to disclose the clock face imprinted thereon by the die 12, whereupon the operator stops cranking and tears or cuts off the projecting portion of the tape upon which the arrows imprinted by the dies 20 and 21 will indicate the exact quantity of liquid dispensed, the indication being in gallons, quarts and fractions of quarts, and this portion forms the ticket 60 which he delivers to the customer.

What I claim is:

1. The combination with a dispensing pump mechanism, of a reciprocable die-carrying member, operating connections between the said mechanism and said member to cause said member to reciprocate in one direction, a locking member to hold the reciprocable member at the end of the latter movement, resilient means to move the reciprocable member in the opposite direction, and a movable member adapted to release the locking member from the reciprocable member.

2. The combination with a dispensing pump mechanism, of a reciprocable die-carrying member, operating connections between the said mechanism and said member to cause said member to reciprocate in one direction, a locking member to hold the reciprocable member at the end of the latter movement, resilient means to move the reciprocable member in the opposite direction, a movable member adapted to release the locking member from the reciprocable member, means to lock the movable member against movement and means driven by the pump mechanism to release the latter locking means at a predetermined time.

3. The combination with a dispensing pump mechanism, of a reciprocable die-carrying member, resilient means to move the said member in one direction, a member engaging the reciprocable member and having an operating connection to the pump mechanism for moving the reciprocable member in the opposite direction, a slidable member adapted to engage and lock the reciprocable member at the end of the latter movement, a longitudinally movable cam-carrying shaft adapted to engage the slidable member and to release the same from the reciprocable member.

4. In a dispensing pump mechanism and revoluble quantity indicating members operatively connected to the pump mechanism, a die platen adapted to abut the indicating members, means operatively connected to the pump mechanism and to the die platen to retract the die platen, means to lock the platen in retracted condition, means engaging the platen to cause the platen to move toward the indicating members and a longitudinally slidable member adapted to engage and release the locking means.

5. In a dispensing pump mechanism and revoluble quantity indicating members operatively connected to the pump mechanism, a movable die-carrier having a die platen thereon adapted to abut the indicating members, a member engaging the die carrier and operatively connected to the pump mechanism and adapted to retract the carrier, resilient means opposing the retracting movement of the carrier, a member movably engaging the carrier and adapted to lock the carrier in retracted condition and means to engage and operate the latter member to cause said member to release the carrier.

6. In a dispensing pump mechanism and revoluble die members having driving connection with the pump mechanism, a reciprocable die member adapted to abut the revoluble die members, resilient means to cause the reciprocable die member to move toward the revoluble die members, a member engaging the reciprocable die member and operatively connected to the pump mechanism and adapted to retract the said die member, a locking member adapted to engage and hold the reciprocable die member in retracted position and a movable cam adapted to disengage the locking member from the reciprocable die member.

In witness whereof I have hereunto set my hand this 27th day of November, 1925.

LEE R. HARTLEY.